(12) United States Patent
Cho et al.

(10) Patent No.: US 10,069,425 B2
(45) Date of Patent: Sep. 4, 2018

(54) SWITCHING POWER SUPPLY DEVICE FOR REDUCING ENERGY LOSS

(71) Applicant: Konica Minolta, Inc., Tokyo (JP)

(72) Inventors: Kouei Cho, Aichi (JP); Mikiyuki Aoki, Aichi (JP); Toru Kasamatsu, Aichi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/456,729

(22) Filed: Mar. 13, 2017

(65) Prior Publication Data

US 2017/0271994 A1 Sep. 21, 2017

(30) Foreign Application Priority Data

Mar. 15, 2016 (JP) .................................. 2016-050452

(51) Int. Cl.
*H02M 3/335* (2006.01)

(52) U.S. Cl.
CPC ............................... *H02M 3/33523* (2013.01)

(58) Field of Classification Search
None
See application file for complete search history.

(56) References Cited

U.S. PATENT DOCUMENTS

| 2010/0073351 A1* | 3/2010 | Lin | H02M 3/33523 345/212 |
| 2010/0142232 A1* | 6/2010 | Lin | H02M 3/33523 363/21.16 |
| 2011/0228565 A1* | 9/2011 | Griffin | H02M 1/36 363/21.01 |
| 2011/0292693 A1* | 12/2011 | Niijima | H02M 3/33507 363/21.17 |

FOREIGN PATENT DOCUMENTS

| JP | 2005-341709 A | 12/2005 |
| JP | 2010-063293 A | 3/2010 |
| JP | 2013-223280 A | 10/2013 |

* cited by examiner

*Primary Examiner* — Jeffrey Gblende
(74) *Attorney, Agent, or Firm* — Osha Liang LLP (57) ABSTRACT

A power supply device having a transformer and a control circuit for controlling a power input to the transformer in accordance with a set value of an output voltage is provided. The power supply device includes an auxiliary winding provided in the transformer and a control power supply circuit configured to rectify AC power produced in the auxiliary winding to output a control voltage for operating the control circuit. The control power supply circuit includes a smoothing capacitor which is connected between output terminals for the control voltage and is to be charged with power obtained by rectifying the AC power, and a charge thinning circuit configured to intermittently charge the smoothing capacitor so that a voltage value between both ends of the smoothing capacitor reaches a set value of the control voltage.

13 Claims, 8 Drawing Sheets

SWITCHING POWER SUPPLY DEVICE FOR REDUCING ENERGY LOSS

The present U.S. patent application claims a priority under the Paris Convention of Japanese patent application No. 2016-050452 filed on Mar. 15, 2016, the entirety of which is incorporated herein by reference.

BACKGROUND OF THE INVENTION

1. Field of the Invention

The present invention relates to a switching power supply device.

2. Description of the Related Art

Switching DC stabilized power supply devices are used to, for example, convert commercial AC to DC. In this type of power supply device, a switching circuit converts DC power produced by rectifying and smoothing commercial AC power to AC power which is then fed to a primary winding of a transformer. The AC power induced in a secondary winding of the transformer is rectified and smoothed, so that DC power is outputted. Output voltage fluctuation is fed back to control the switching circuit, so that the output voltage is stabilized.

The power supply device is provided with a control power supply circuit to output a control voltage. The control voltage is a DC voltage to operate a control circuit for controlling the switching circuit. In order to generate a control voltage, the transformer has an auxiliary winding. The control power supply circuit converts an AC voltage induced in the auxiliary winding to a control voltage having a predetermined value.

The power supply device is so configured that a set value of the output voltage can be changed. For example, the power supply device switches the set value from a first value to a second value smaller than the first value when a load device to which the output power is supplied is turned from a normal mode to a sleep mode (power-saving mode). The power supply device switches the set value from the second value to the first value when the load device exits the sleep mode to enter the normal mode.

In response to the switching of the set value of the output voltage, the value of the AC voltage induced in the auxiliary winding, namely, the output level of the auxiliary winding, varies greatly. In order to operate the control circuit correctly, it is necessary to supply a control voltage having a value which is within the range of the rated voltage.

Conventional technologies have been proposed for supplying a control voltage having an appropriate value to the control circuit in Japanese Unexamined Patent Application Publication Nos. 2005-341709 and 2013-223280.

The former publication discloses a circuit configuration in which an auxiliary winding is provided so that an AC voltage equal to or greater than a necessary control voltage value is induced when the set value of the output voltage is low, and after the induced AC voltage is rectified, a 3-terminal regulator (dropper) is used for reduction to the control voltage.

The latter publication discloses the following: auxiliary windings different in numbers of turns are provided in a transformer. In accordance with a control signal for setting an output voltage, a driving voltage (control voltage) is generated based on any of AC voltages induced in the auxiliary windings.

In the meantime, a conventional technology has been proposed for reducing power consumption of a power supply device (Japanese Unexamined Patent Application Publication No. 2010-063293). The publication discloses stopping, in a standby state, supplying the electric current to a detection circuit for detecting an output voltage, and controlling a switching element so that a voltage developed in an auxiliary winding is constant instead of controlling the switching element based on a feedback signal from a secondary side.

As described in the technology of Japanese Unexamined Patent Application Publication No. 2005-341709, according to the circuit configuration in which the 3-terminal regulator is used to drop a voltage to generate a control voltage, power corresponding to the voltage drop is always consumed by the 3-terminal regulator. The technology thus has a problem of unnecessarily large loss of energy which causes the 3-terminal regulator to develop heat, in particular, when a set value of the output voltage is large in the power supply device.

The technology of Japanese Unexamined Patent Application Publication No. 2013-223280 has a problem that the transformer has to be large because of the plurality of auxiliary windings. Further, the plurality of rectifiers for rectifying the output of the auxiliary windings are needed, and they are used selectively depending on the set value of the output voltage, which lowers the efficiency of the circuit components.

The technology of Japanese Unexamined Patent Application Publication No. 2010-0632963 cannot solve the foregoing problems related to the control power supply circuit because the technology is directed to reduction in power consumption of the detection circuit.

SUMMARY

The present invention has been achieved in light of such a problem, and therefore, an object of an embodiment of the present invention is to reduce the energy loss in a circuit of outputting a control voltage.

To achieve at least one of the objects mentioned above, according to an aspect, a power supply device including a transformer and a control circuit for controlling a power input to the transformer in accordance with a set value of an output voltage, the power supply device includes an auxiliary winding provided in the transformer; and a control power supply circuit configured to rectify AC power produced in the auxiliary winding to output a control voltage for operating the control circuit; wherein the control power supply circuit includes a smoothing capacitor which is connected between output terminals for the control voltage and is to be charged with power obtained by rectifying the AC power, and a charge thinning circuit configured to intermittently charge the smoothing capacitor so that a voltage value between both ends of the smoothing capacitor reaches a set value of the control voltage.

Preferably, the control power supply circuit includes a rectifier configured to rectify the AC power to output a resultant as the power obtained by rectification, and the charge thinning circuit includes a frequency divider for dividing a frequency of a voltage signal produced by rectification and a switching circuit which is controlled to turn ON/OFF by a voltage signal which has been subjected to frequency division and intermittently supplies a current flowing from the rectifier to the smoothing capacitor.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present will be described with reference to the drawings. However, the scope of the invention is not limited to the illustrated examples.

Figure 1:
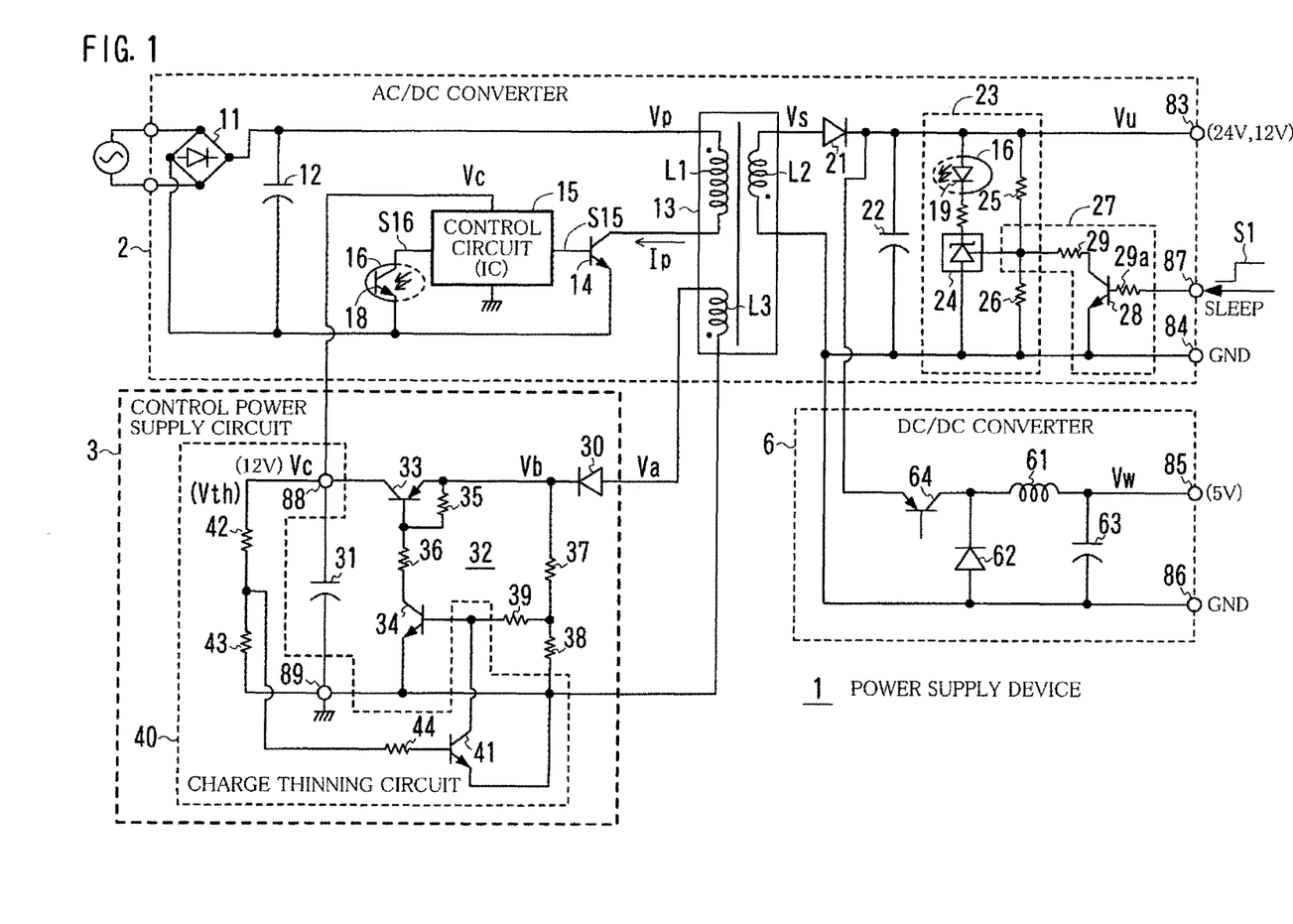
FIG. 1 is a diagram showing a first example of the circuit configuration of a power supply device according to an embodiment of the present invention.
Figure 2:
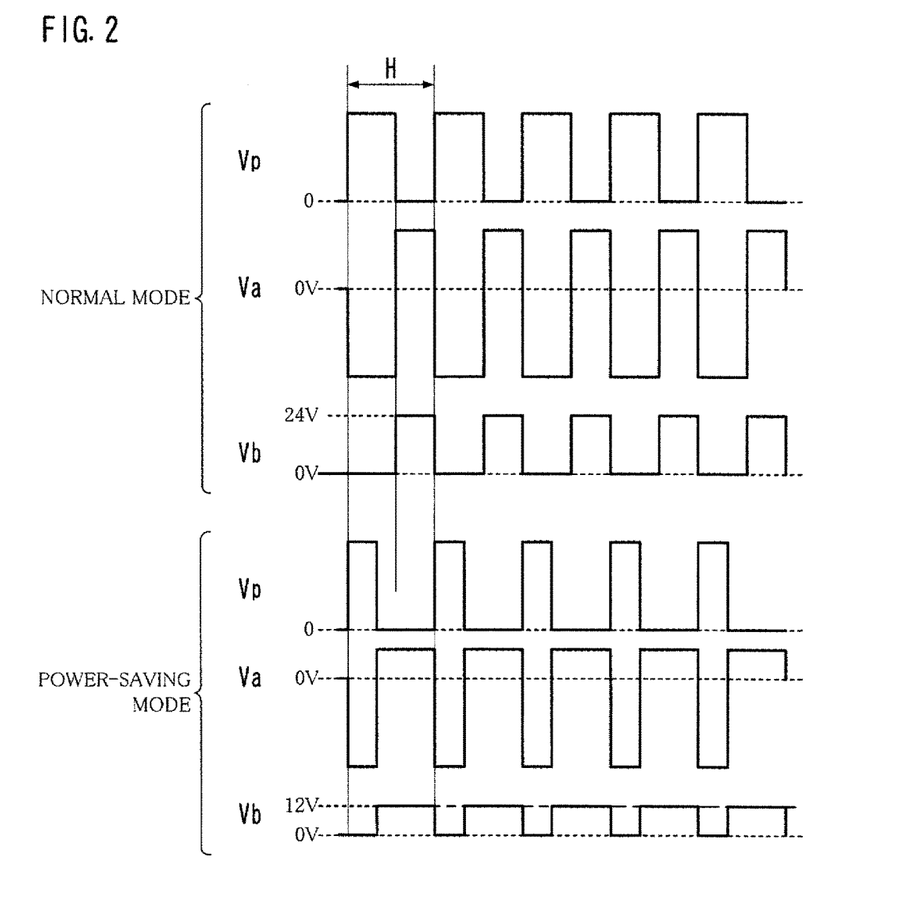
FIG. 2 is a diagram schematically showing a voltage waveform of the main part of a power supply device.
Figure 3:
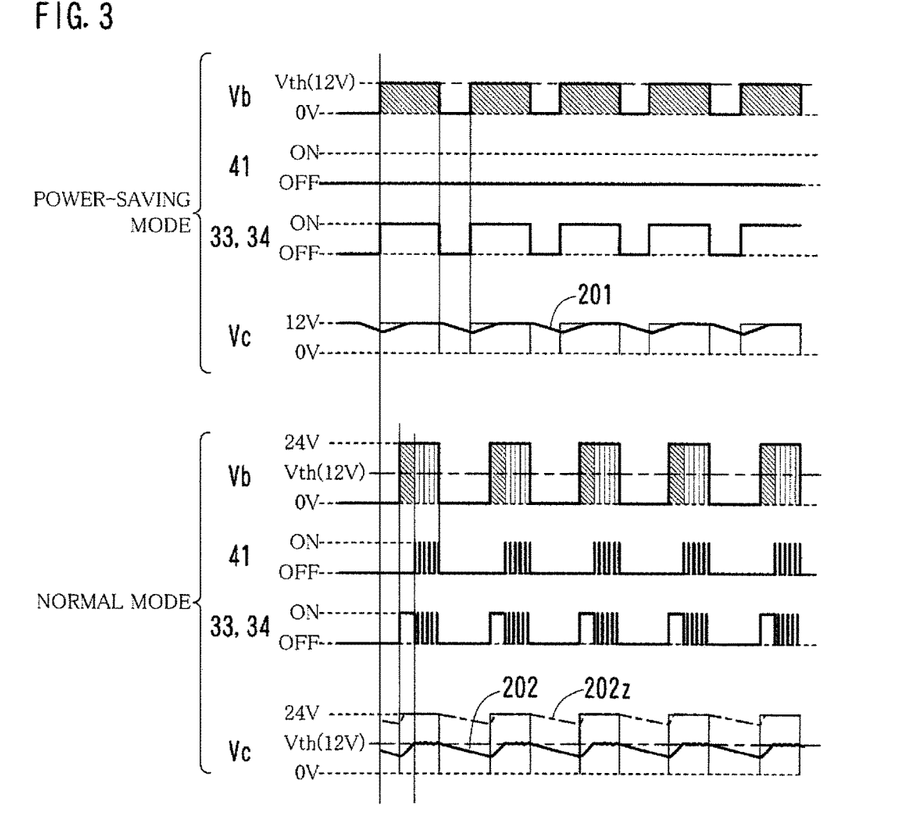
FIG. 3 is a diagram schematically showing a voltage waveform of the main part of a power supply device.

FIG. 1 shows a first example of the circuit configuration of a power supply device 1 according to an embodiment of the present invention. FIGS. 2 and 3 schematically show a voltage waveform of the main part of the power supply device 1.

Referring to FIG. 1, the power supply device 1 includes a flyback-type AC/DC converter 2, a control power supply circuit 3, and a diode rectification (also called step-down chopper) DC/DC converter 6. The control power supply circuit 3 outputs a control voltage Vc to operate the control circuit 15 of the AC/DC converter 2. The circuit configuration of the power supply device 1 is detailed below.

The AC/DC converter 2 has a transformer 13 for transmitting power from a primary (input) side to a secondary (output) side. The transformer 13 has a primary winding L1, a secondary winding L2, and an auxiliary winding L3. The auxiliary winding L3 is provided on the primary side. The auxiliary winding L3 outputs an AC voltage Va which has the same phase as that of the output of the secondary winding L2.

The AC/DC converter 2 includes, on its primary side, a diode bridge 11, a smoothing capacitor 12, a transistor 14, a control circuit 15, and a photosensor 18 of a photocoupler 16.

The diode bridge 11 provides full-wave rectification to an input from commercial AC. The smoothing capacitor 12 smooths the pulsating which has been subjected to the full-wave rectification. The transistor 14 is a switching device for intermittently inputting the power (current) to the primary winding L1 at a high frequency of approximately one through several KHz. The transistor 14 is inserted between an end of the primary winding L1 and a negative terminal of the smoothing capacitor 12 for switching.

The control circuit 15 controls ON/OFF of the transistor 14 in accordance with a feedback signal S16 supplied from the secondary side via the photocoupler 16. The control circuit 15 is realized by an Integrated circuit (IC). The control circuit 15 outputs, for example, a pulse width modulation signal S15 as a control signal to the transistor 14.

When the transistor 14 is turned ON, a current due to a voltage Vp flows through the primary winding L1, so that an energy is accumulated. When the transistor 14 is switched from ON to OFF, the current flowing through the primary winding L1 reaches 0 (zero) and the accumulated energy induces a voltage Vs in the secondary winding L2.

The AC/DC converter 2 includes, on its secondary side, a diode 21, a smoothing capacitor 22, an output voltage detection circuit 23, an output setting circuit 27, output terminals 83 and 84, and an output setting terminal 87. The output voltage detection circuit 23 includes a detection Integrated Circuit (detection IC) 24, resistors 25 and 26, and a light emitter 19 of the photocoupler 16. The output setting circuit 27 includes a transistor 28 and resistors 29 and 29a.

The AC power outputted by the secondary winding L2 undergoes half-wave rectification by the diode 21, and the resultant is smoothed by the smoothing capacitor 22. The voltage across terminals of the smoothing capacitor 22 is applied, as an output voltage Vu, through the output terminals 83 and 84 to a load.

The set value of the output voltage Vu is two-way switchable between a first value (24 volts, for example) and a second value (12 volts, for example) smaller than the first value. The first value is a set value in a normal mode. The second value is a set value in a power-saving mode. The set value is switched depending on a voltage level of the output setting terminal 87.

The detection IC 24 of the output voltage detection circuit 23 supplies a current through the photocoupler 16 depending on a voltage produced by dividing the output voltage Vu with the resistors 25 and 26, namely, depending on the division value. Thereby, the amount of light emission from the light emitter 19 of the photocoupler 16 increases/decreases depending on the output voltage Vu. This is detected by the photosensor 18, resulting in the feedback signal S16 depending on the amount of light emission. Stated differently, the fluctuation in output voltage Vu on the secondary side is fed back to the primary side.

The transistor 28 of the output setting circuit 27 is turned ON when the output setting terminal 87 is supplied with a sleep signal S1 for giving a command to switch to the power-saving mode. In response to the transistor 28 turned ON, the division ratio changes, so that the voltage fed to the detection IC 24, namely, the division value, changes, thereby the detection IC 24 increases/decreases the amount of light emission from the photocoupler 16 with the second value used as the reference.

In the AC/DC converter 2, the control circuit 15 controls, based on the feedback signal S16, a power input to the transformer 13 depending on the set value of the output voltage Vu so that the output voltage Vu reaches the set value. To be specific, the duty ratio of the pulse width modulation signal S15 is so adjusted that the ON period of the transistor 14 is shortened when the value of the output voltage Vu is greater than the set value, and that the ON period of the transistor 14 is lengthened when the value of the output voltage Vu is smaller than the set value. The AC/DC converter 2, thus, outputs a 24-volt DC power (first value) or a 12-volt DC power (second value).

The DC/DC converter 6 includes a choke coil 61, a diode 62, a smoothing capacitor 63, a transistor 64, and output terminals 85 and 86. The DC/DC converter 6 is so configured that the output voltage Vu of the AC/DC converter 2 is decreased and the resultant output voltage Vu is outputted.

The set value of an output voltage Vw of the DC/DC converter 6 is a third value smaller than the second value, for example, 5 volts.

As described above, when the set value of the output voltage Vu of the AC/DC converter 2 is switched to the second value in the power-saving mode, the difference between the input voltage (Vu) and the output voltage Vw of the DC/DC converter 6, i.e., the input/output potential difference, is reduced. This increases the conversion efficiency of power in the DC/DC converter 6. Stated differently, lowering the set value of the output voltage Vu reduces the power consumption of the power supply device 1.

In the meantime, the control power supply circuit 3 includes a rectifier 30, a smoothing capacitor 31, a charge adjusting circuit 32, and a charge thinning circuit 40.

The rectifier 30 is realized by a diode. The rectifier 30 provides half-wave rectification to the AC power produced in the auxiliary winding L3 and outputs the resultant. The smoothing capacitor 31 is connected between the output terminals 88 and 89 for the control voltage Vc. The smoothing capacitor 31 is charged with the power which has undergone the half-wave rectification and is outputted by the rectifier 30.

The charge adjusting circuit 32 includes a PNP transistor 33, an NPN transistor 34, and resistors 35, 36, 37, 38, and 39. The emitter and the collector of the transistor 33 are connected to the rectifier 30 and an output terminal 88, respectively. The collector of the transistor 34 is connected through the resistor 36 to the base of the transistor 33. The emitter of the transistor 34 is connected to the output terminal 89. The charge adjusting circuit 32 adjusts an amount of the current to charge the smoothing capacitor 31 so that the control voltage Vc is kept at a constant level in accordance with the fluctuation in voltage Vb which has undergone the half-wave rectification by the rectifier 30.

The charge thinning circuit 40 includes an NPN transistor 41, and resistors 42, 43, and 44. The collector and the emitter of the transistor 41 are connected to the base of the transistor 34 of the charge adjusting circuit 32 and the output terminal 89, respectively. The resistors 42 and 43 are provided in series between the output terminals 88 and 89 to divide the control voltage Vc. The resistor 44 is disposed between the base of the transistor 41 and the connection point of the resistors 42 and 43.

When the value of the control voltage Vc exceeds a threshold Vth, the divided voltages turn the transistor 41 ON. This turns the transistor 34 of the charge adjusting circuit 32 OFF, and also turns the transistor 33 OFF. Thus, the smoothing capacitor 31 is not charged. When the value of the control voltage Vc does not exceed the threshold Vth, the transistor 41 is turned OFF, and the transistors 33 and 34 operate in a non-saturated state to charge the smoothing capacitor 31.

In short, the charge thinning circuit 40 intermittently charges the smoothing capacitor 31 so that the value of the control voltage Vc reaches the threshold Vth. The threshold Vth is so selected to satisfy that: it corresponds to the set value of the control voltage Vc; it is a value within a rated voltage range and is higher than a value of the minimum operational voltage of the control circuit 15, namely, within a range of 7-15 volts; and it is equal to or greater than the minimum operational voltage of the DC/DC converter 6.

The description goes on to the operation related to the charge thinning circuit 40 of the power supply device 1 further with reference to FIGS. 2 and 3.

As shown in FIG. 2, the voltage Vp on the primary side is intermittently applied to the primary winding L1, so that a current Ip flows intermittently. In the power supply device 1, it is supposed that a cycle H of the intermission of the voltage Vp is set at a constant value (approximately, a few microseconds) independent of whether the normal mode or the power-saving mode is entered. It is noted that the duty ratio of the application of the voltage Vp is greater in the normal mode than in the power-saving mode.

Along with the intermission of the voltage Vp, the AC voltage Va is developed in the auxiliary winding L3. The peak value of the AC voltage Va on the positive side is greater in the normal mode than in the power-saving mode.

The voltage Vb outputted by the rectifier 30 of the control power supply circuit 3 is a positive voltage of the AC voltage Va, and has a pulse train waveform with the cycle H. The peak value of the voltage Vb is substantially equal to the set value of the output voltage Vu of the AC/DC converter 2. To be specific, the peak value of the output voltage Vb in the normal mode is approximately 24 volts, and the peak value of the output voltage Vb in the power-saving mode is approximately 12 volts. Stated differently, the number of turns in the auxiliary winding L3 is so selected that the voltage Vb corresponding to the set value of the output voltage Vu is obtained as the output of the rectifier 30.

As shown in FIG. 3, the threshold Vth in the charge thinning circuit 40 is selected at 12 volts (second value) which is the set value of the output voltage Vu in the power-saving mode or a value slightly greater than 12 volts.

In the power-saving mode, basically, the voltage Vb does not exceed the threshold Vth. Thus, the transistor 41 of the charge thinning circuit 40 remains OFF. The transistors 33 and 34 of the charge adjusting circuit 32 turn into an operational state for controlling a charging current when the value of the voltage Vb is equal to or greater than a positive predetermined value. Thus, the control voltage Vc generated between the both ends of the smoothing capacitor 31 remains at 12 volts or so as shown by a solid line 201.

In the normal mode, the voltage Vb exceeds the threshold Vth. Thus, if charging is performed without providing the charge thinning circuit 40 for the case where the value of the voltage Vb is equal to or greater than the positive predetermined value, as with the case of the power-saving mode, the control voltage Vc remains at 24 volts or so as shown by a dot-dash line 202*z*. This causes a voltage exceeding the rated voltage to be applied to the control circuit 15, which probably damages the control circuit 15.

As discussed above, the charge thinning circuit 40 intermittently charges the smoothing capacitor 31 in response to the control voltage Vc exceeding the threshold Vth. Thus, the control voltage Vc remains at 12 volts or so as shown by a solid line 202.

The transistors 33 and 34 (particularly, transistor 33) do not produce heat while charging is not performed because of the transistors 33 and 34 of the charge adjusting circuit 32 turned OFF. In other words, unlike the conventional configuration using a 3-terminal regulator, energy loss due to the heat production does not occur for the case where the voltage Vb drops so as to be suitable as the control voltage Vc. This reduces the power consumption necessary to generate the control voltage Vc as compared to the conventional technologies.

Figure 4:
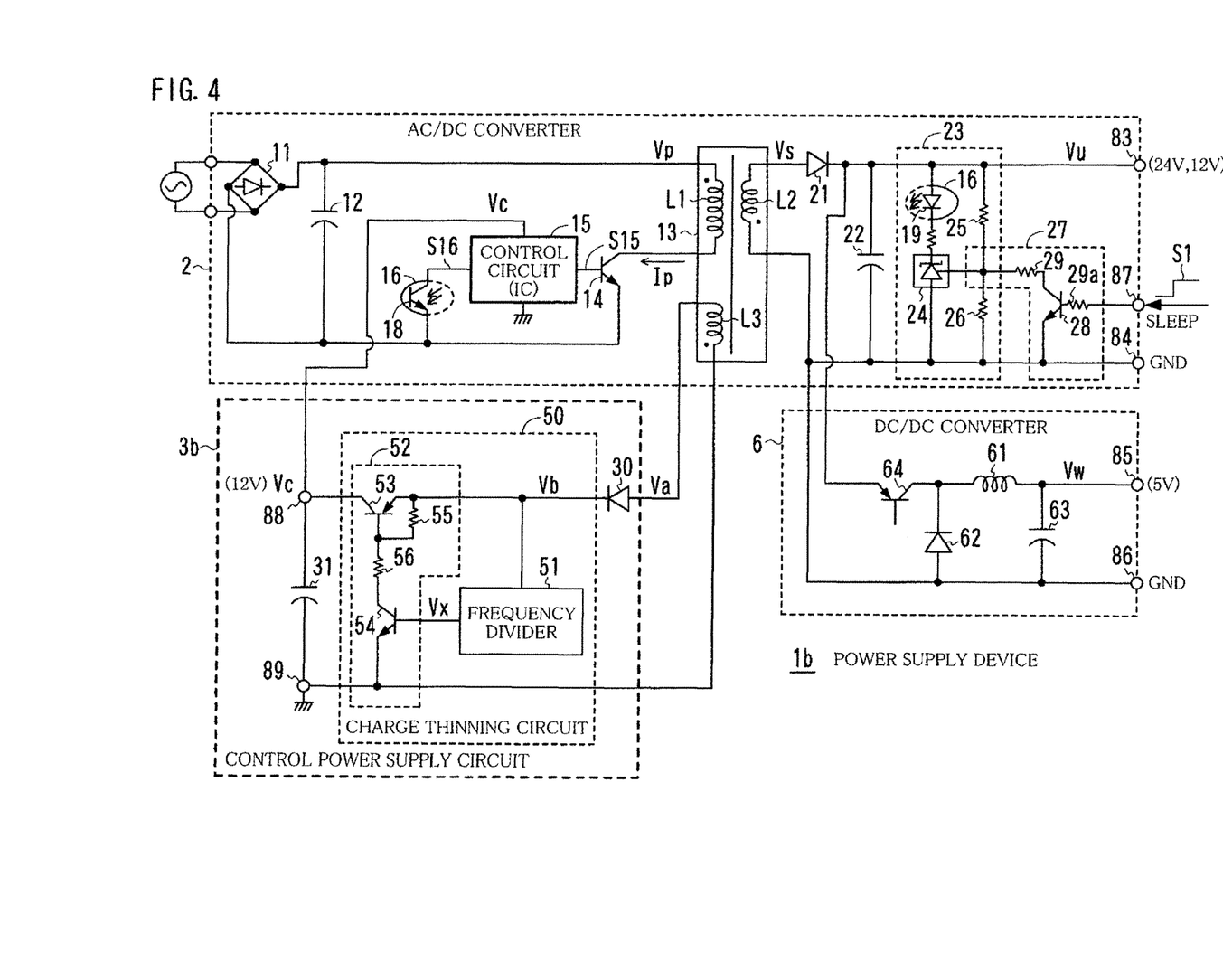
FIG. 4 is a diagram showing a second example of the circuit configuration of a power supply device.
Figure 5:
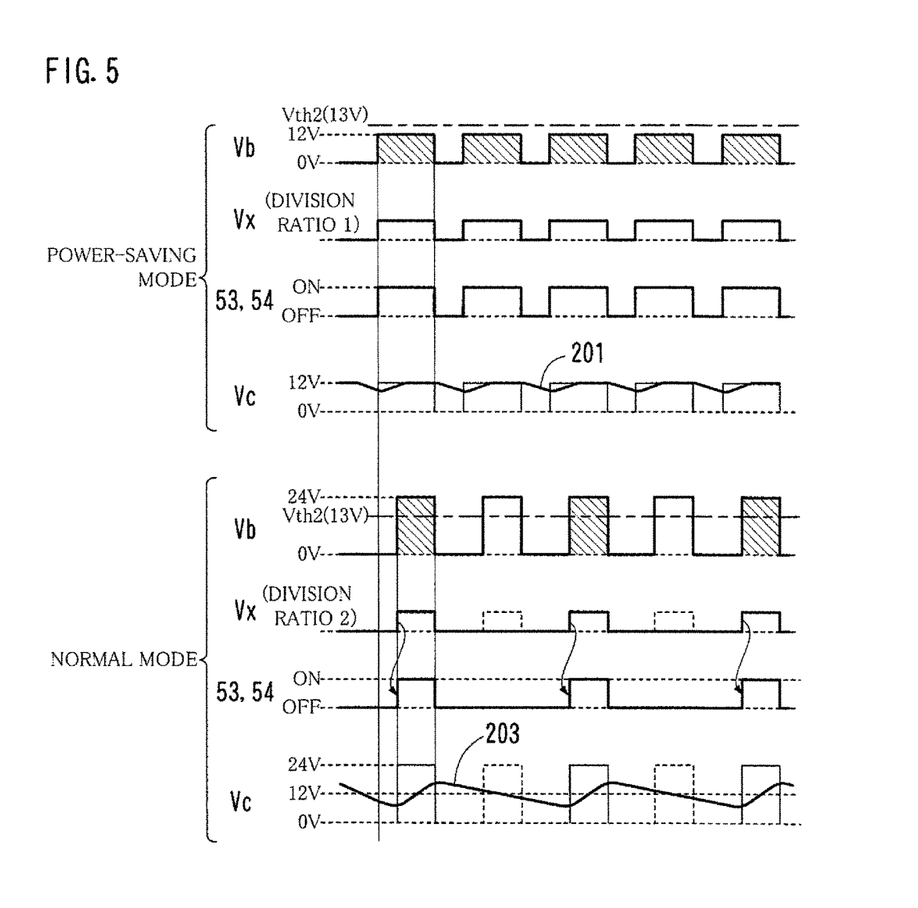
FIG. 5 is a diagram schematically showing a voltage waveform of the main part of a power supply device.

FIG. 4 shows a second example of the circuit configuration of a power supply device 1*b*. FIG. 5 schematically shows a voltage waveform of the main part of the power supply device 1*b*. In FIG. 4, portions that have the same functions as those in FIG. 1 are identified with the identical reference symbols, and the description thereof will not be repeated or will be simplified. The same applies to the descriptions hereinafter.

The basic configuration of the power supply device 1*b* of FIG. 4 is the same as that of the power supply device 1 of FIG. 1. The power supply device 1*b* differs from the power supply device 1 in that the power supply device 1*b* has a control power supply circuit 3*b* instead of the control power supply circuit 3 of the power supply device 1.

The control power supply circuit 3*b* includes the rectifier 30, the smoothing capacitor 31, and a charge thinning circuit 50. The control power supply circuit 3*b* outputs the control voltage Vc for operating the control circuit 15 of the AC/DC converter 2.

The rectifier 30 is realized by a diode. The rectifier 30 provides half-wave rectification to the AC power produced in the auxiliary winding L3 and outputs the resultant. The smoothing capacitor 31 is connected between the output terminals 88 and 89 for the control voltage Vc. The smoothing capacitor 31 is charged with the power which has undergone the half-wave rectification.

The charge thinning circuit 50 includes a frequency divider 51 for dividing the frequency of a voltage signal produced by rectification by the rectifier 30, namely, the frequency of the voltage Vb, and a switching circuit 52 which is controlled to turn ON/OFF by a voltage signal Vx which has been subjected to the frequency division and intermittently supplies a current flowing from the rectifier 30 to the smoothing capacitor 31.

The frequency divider 51 includes, for example, a pulse shaping circuit for shaping the waveform of the voltage signal and a flip-flop circuit for thinning out the shaped pulse to output the resultant. The frequency divider 51 outputs, to the switching circuit 52, the voltage signal Vx which has been subjected to the frequency division as an ON/OFF control signal.

The division ratio of the frequency divider 51 is different between the normal mode and the power-saving mode. The division ratio in the normal mode is set, for example, at 2. The voltage signal Vx corresponds to a signal obtained by thinning out every other pulse of the pulses of the voltage signal (Vb) outputted by the rectifier 30. The division ratio in the power-saving mode is set, for example, at 1. Stated differently, in the power-saving mode, the voltage signal Vx corresponds to the voltage signal (Vb) with no pulses thinned out.

The frequency divider 51 switches the division ratio between 2 and 1, for example, depending on the peak value of the voltage signal (Vb).

The switching circuit 52 includes a PNP transistor 53, an NPN transistor 54, and resistors 55 and 56. The emitter and the collector of the transistor 53 are connected to the rectifier 30 and the output terminal 88, respectively. The collector of the transistor 54 is connected through the resistor 56 to the base of the transistor 53. The emitter of the transistor 54 is connected to an output terminal 89. The base of the transistor 54 is supplied with the voltage signal Vx from the frequency divider 51. The resistor 55 is connected to the emitter and the base of the transistor 53.

While the voltage signal Vx is at a high (H) level, both the transistors 53 and 54 are in an ON-state. Thus, the smoothing capacitor 31 is charged through the transistor 53. While the voltage signal Vx is at a low (L) level, both the transistors 53 and 54 are in an OFF-state. Thus, the smoothing capacitor 31 is not charged.

As shown in FIG. 5, a threshold Vth2 is set. This enables the frequency divider 51 on the primary side to change the division ratio without conveying a change command from the secondary side to the primary side. The threshold Vth2 is selected to be slightly higher than 12 volts (second value) which is the set value of the output voltage Vu, for example, selected to be 13 volts.

The frequency divider 51 switches the division ratio from 1 to 2 when the peak value of the voltage signal (Vb) exceeds the threshold Vth2. The frequency divider 51 switches the division ratio from 2 to 1 when input of a pulse whose peak value does not exceed the threshold Vth2 is detected.

In the power-saving mode, the division ratio is 1 because the peak value of the voltage signal (Vb) basically does not exceed the threshold Vth2. The voltage signal Vx turns into a signal corresponding to the voltage signal (Vb) with no pulses thinned out. In accordance with the voltage signal Vx, the transistors 53 and 54 of the switching circuit 52 are turned ON or OFF. In short, the smoothing capacitor 31 is so charged that the voltage signal (Vb) is reflected as-is.

Thus, the control voltage Vc developed in the smoothing capacitor 31 stays around 12 volts as shown by the solid line 201.

In the normal mode, the division ratio is 2 because the peak value of the voltage signal (Vb) exceeds the threshold Vth2. The voltage signal Vx turns into a signal where every other pulse of the voltage signal (Vb) is thinned out. In accordance with the voltage signal Vx, the transistors 53 and 54 of the switching circuit 52 are turned ON or OFF. In short, the smoothing capacitor 31 is so charged that the voltage signal (Vb) is intermitted every other pulse.

Thus, the control voltage Vc stays within the rated voltage range of the control circuit 15 with 12 volts used as a value close to the median as shown by the solid line 203.

According to the power supply device 1*b*, the transistors 53 and 54 do not produce heat while charging is stopped because of the transistors 53 and 54 of the switching circuit 52 turned OFF. In other words, unlike the conventional configuration using a 3-terminal regulator, energy loss due to the heat production does not occur for the case where the voltage Vb drops so as to be suitable as the control voltage Vc. This reduces the power consumption necessary to generate the control voltage Vc as compared to the conventional technologies.

Figure 6:
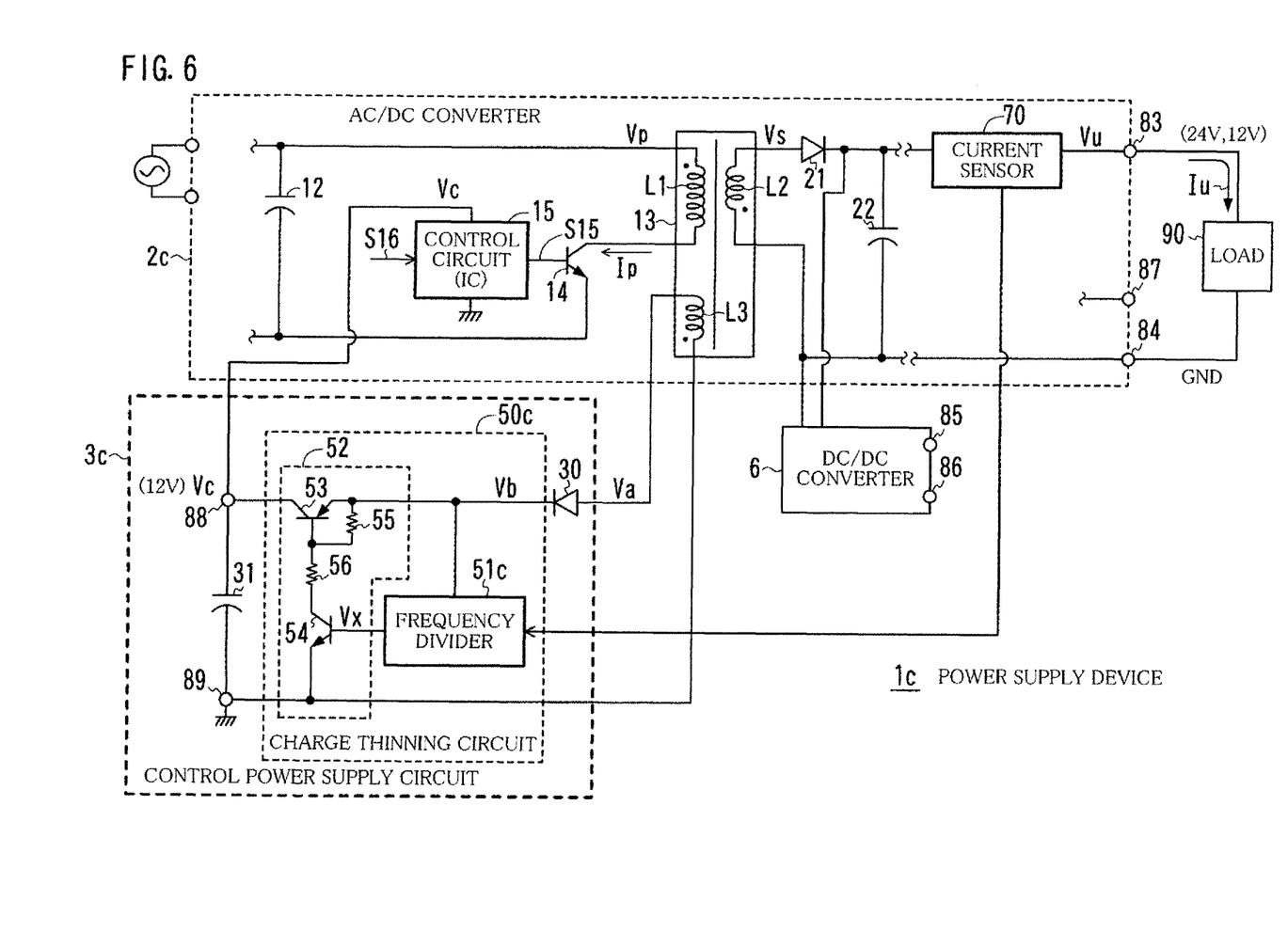
FIG. 6 is a diagram showing a third example of the circuit configuration of a power supply device.

FIG. 6 shows a third example of the circuit configuration of a power supply device 1C.

In FIG. 6, the basic configuration of the power supply device 1*c* is the same as that of the power supply device 1*b* of FIG. 4. The power supply device 1*c* differs from the power supply device 1*b* in that the power supply device 1*c* has a control power supply circuit 3*c* instead of the control power supply circuit 3*b* of the power supply device 1, and that the power supply device is has a current sensor 70 for detecting a current Iu flowing from the output terminal 83 to a load 90.

The control power supply circuit 3*c* includes the rectifier 30, the smoothing capacitor 31, and a charge thinning circuit 50*c*. The control power supply circuit 3*c* outputs the control voltage Vc for operating the control circuit 15 of the AC/DC converter 2.

The charge thinning circuit 50*c* has the same configuration as that of the charge thinning circuit 50 of FIG. 4 except that the charge thinning circuit 50*c* has a frequency divider 51*c* instead of the frequency divider 51.

As with the frequency divider 51 of FIG. 4, the frequency divider 51*c* uses different division ratios for the normal mode and for the power-saving mode to divide the frequency of the voltage signal (Vb), and outputs the voltage signal Vx which has been subjected to the frequency division.

If the current sensor 70 detects the current Iu having a value equal to or greater than a preset value, the frequency divider 51c sets the division ratio at a value greater than 1 in accordance with the value of the current Iu to output the voltage signal Vx obtained by thinning out pulses of the voltage signal (Vb) independently of which of the normal mode and the power-saving mode is entered.

Thus, even if the load 90 is increased to increase the current Iu which, in turn, raises the voltage Vb, the control voltage Vc can be kept at a value within the rated voltage range of the control circuit 15.

Figure 7:
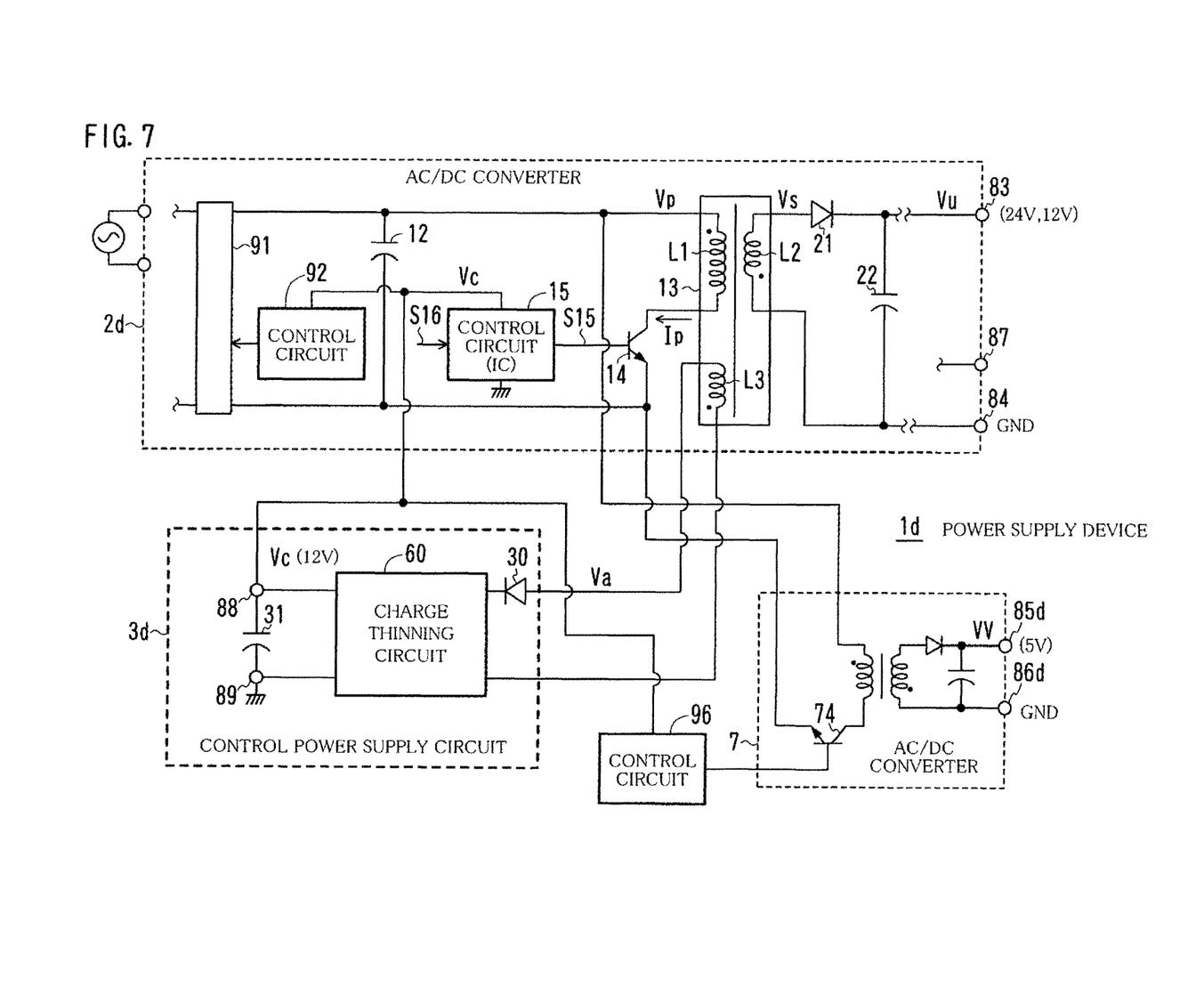
FIG. 7 is a diagram showing a fourth example of the circuit configuration of a power supply device.

FIG. 7 shows a fourth example of the circuit configuration of a power supply device 1d.

Referring to FIG. 7, the power supply device 1d includes an AC/DC converter 2d, a control power supply circuit 3d, an AC/DC converter 7, and a control circuit 96 for controlling ON/OFF of a transistor 74 of the AC/DC converter 7.

The AC/DC converter 2d includes an active filter 91 provided in a preceding stage of the smoothing capacitor 12 and a control circuit 92 for controlling the active filter 91. The other configuration of the AC/DC converter 2d is the same as that of the AC/DC converter 2 of FIG. 1. The control power supply circuit 3d includes the rectifier 30, the smoothing capacitor 31, and a charge thinning circuit 60. The control power supply circuit 3d outputs, to the control circuits 15 and 92 of the AC/DC converter 2 and the control circuit 96 of the AC/DC converter 7, the control voltage Vc to control the same. The AC/DC converter 7 applies a voltage Vv (5 volts, for example) between the output terminals 85d and 86d.

The configuration of the charge thinning circuit 60 may be the same as that of the charge thinning circuit 40 of FIG. 1 or of the charge thinning circuit 50 of FIG. 4.

According to the power supply device 1d, one or both of the control circuits 92 and 96 stops during the operation of the control circuit 15, which leads to the reduction in load on the control power supply circuit 3d. When this causes the control voltage Vc to start increasing, the smoothing capacitor 31 is intermittently charged so as to prevent the control voltage Vc from increasing.

Figure 8:
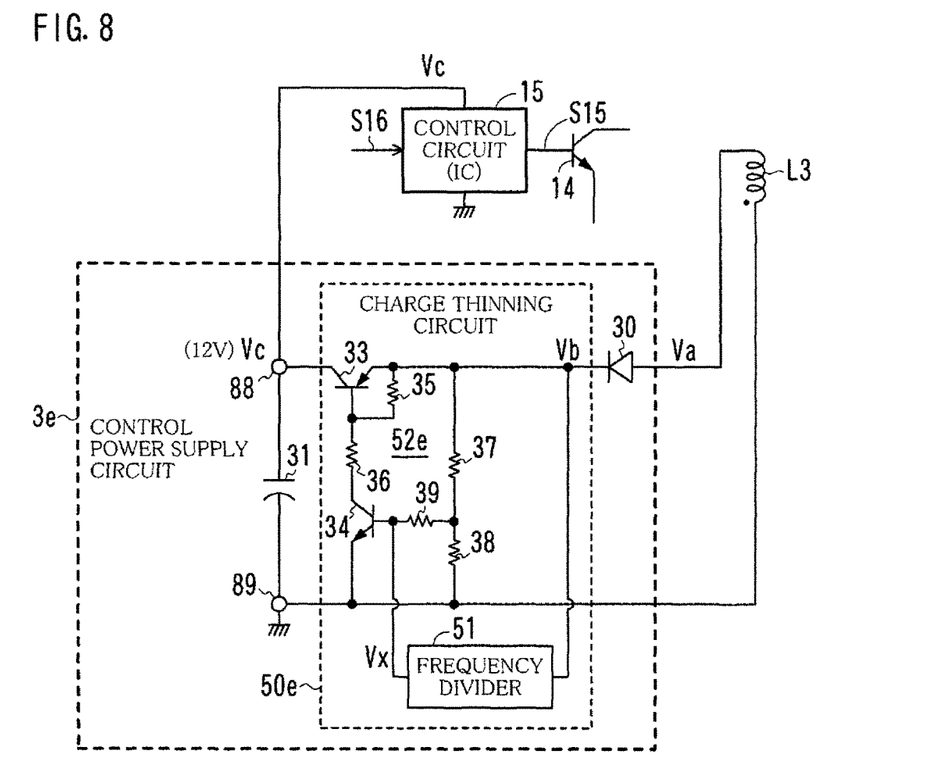
FIG. 8 is a diagram showing another example of a control power supply circuit.

FIG. 8 shows another example of a control power supply circuit 3e.

Referring to FIG. 8, the control power supply circuit 3e includes the rectifier 30, the smoothing capacitor 31, the charge adjusting circuit 32, and a charge thinning circuit 50e. The control power supply circuit 3e outputs the control voltage Vc for operating the control circuit 15 of the AC/DC converter 2.

The control power supply circuit 3e has the same configuration as that of the control power supply circuit 3b of FIG. 4 except that the control power supply circuit 3e has the charge thinning circuit 50e instead of the charge thinning circuit 50.

The charge thinning circuit 50e includes the frequency divider 51 for dividing, as described above, the frequency of the voltage signal (vb) rectified by the rectifier 30 and a switching circuit 52e for intermittently supplying a current flowing from the rectifier 30 to the smoothing capacitor 31.

The switching circuit 52e includes the transistors 33 and 34 and the resistors 35 through 39. The switching circuit 52e has the same configuration as that of the charge adjusting circuit 32 of FIG. 1. The base of the transistor 34 is supplied with the voltage signal Vx which has been subjected to the frequency division by the frequency divider 51. The transistors 33 and 34 are turned ON or OFF in accordance with the level of the voltage signal Vx. It is noted that the ON-state of the transistors 33 and 34 means that the transistors 33 and 34 operate in a non-saturated state.

The smoothing capacitor 31 is charged for the case where the transistors 33 and 34 are in the ON state. The smoothing capacitor 31 is not charged where the transistors 33 and 34 are in the OFF state.

In the power-saving mode, the division ratio of the frequency divider 51 is 1, and the voltage signal Vx is a signal corresponding to the voltage signal (Vb) with no pulses thinned out. Thus, the smoothing capacitor 31 is so charged that the voltage signal (Vb) is reflected as-is. The control voltage Vc stays around 12 volts.

In the normal mode, the division ratio of the frequency divider 51 is 2, and the voltage signal Vx is a signal where every other pulse of the voltage signal (Vb) is thinned out. Thus, the smoothing capacitor 31 is so charged that the voltage signal (Vb) is intermitted every other pulse. The control voltage Vc stays within the rated voltage range of the control circuit 15 with 12 volts used as a value close to the median.

According to the foregoing embodiment, the energy loss can be reduced in the control power supply circuits 3, 3b, 3c, and 3e of outputting the control voltage Vc.

In the foregoing embodiment, the frequency dividers 51 and 51c are configured to switch the division ratio based on the voltage Vb. The invention is not limited thereto, and another arrangement is possible. For example, the sleep signal S1 is supplied not only to the output setting circuit 27 but also to the frequency dividers 51 and 51c, and the division ratio is switched based on the sleep signal S1.

The first value and the second value which are set values of the output voltage Vu in the AD/DC converters 2 and 2c and the third value which is a set value of the output voltage Vw of the DC/DC converter 6 may be set appropriately depending on the load.

In the foregoing embodiment, the set value of the control voltage Vc is set at 12 volts. Instead of this, however, the set value of the control voltage Vc may be set at 8 volts for the case where the value of the minimum operational voltage which can ensure the operation of the DC/DC converter 6 is 8 volts, for example. This reduces the input/output potential difference in the DC/DC converter 6, so that the conversion efficiency is improved and the saving energy efficiency is increased.

The control circuit 15 may employ the control method of Pulse Frequency Modulation (PFM).

It is to be understood that the configuration of the power supply devices 1, 1b, 1c, and 1d, the constituent elements thereof, the operation of the circuits, the type of the converter, the thresholds Vth and Vth2, the division ratio, and the like can be appropriately modified without departing from the spirit of the present invention.

Although the present invention has been described and illustrated in detail, it is clearly understood that the present invention is by way of illustrated and example only and is not to be taken by way of limitation, the scope of the present invention being interpreted by terms of the appended claims.

What is claimed is:

1. A power supply device including a transformer and a control circuit for controlling a power input to the transformer in accordance with a set value of an output voltage, the power supply device comprising:
   an auxiliary winding provided in the transformer; and
   a control power supply circuit that rectifies AC power produced in the auxiliary winding to output a control voltage for operating the control circuit, wherein the control power supply circuit includes:
a smoothing capacitor that is connected between output terminals for the control voltage and is to be charged with power obtained by rectifying the AC power;
a rectifier that rectifies the AC power to output a resultant as the power obtained by rectification; and
a charge thinning circuit that intermittently charges the smoothing capacitor so that a voltage value between both ends of the smoothing capacitor reaches a set value of the control voltage, wherein
the charge thinning circuit includes:
a frequency divider that divides a frequency of a voltage signal produced by rectification; and
a switching circuit that:
is controlled to turn ON/OFF by the voltage signal that has been subjected to frequency division, and
intermittently supplies a current flowing from the rectifier to the smoothing capacitor.

2. The power supply device according to claim 1, further comprising a current sensor that detects a value of a current flowing from the power supply device to a load, wherein
the charge thinning circuit intermittently charges the smoothing capacitor when the value of the current detected is equal to or greater than a predetermine value.

3. The power supply device according to claim 1, further comprising an output setting circuit that switches the set value of the output voltage between a first value and a second value smaller than the first value, wherein
the charge thinning circuit intermittently charges the smoothing capacitor when the set value of the output voltage is the first value.

4. The power supply device according to claim 3, comprising a DC/DC converter that outputs DC power having a voltage value of a third value smaller than the second value based on power obtained by rectifying output of the transformer, wherein
the set value of the control voltage is equal to or greater than a value of a minimum operational voltage of the DC/DC converter.

5. The power supply device according to claim 3, wherein the output setting circuit switches the set value of the output voltage to the second value when a signal for giving a command to switch to a power-saving mode is inputted.

6. The power supply device according to claim 1, wherein the set value of the control voltage is greater than a minimum operational voltage of the control circuit.

7. The power supply device according to claim 1, further comprising another control circuit that operates by power of the control voltage supplied from the control power supply circuit and operates or stops while the control circuit operates.

8. A power supply device including a transformer and a control circuit for controlling a power input to the transformer in accordance with a set value of an output voltage, the power supply device comprising:
an auxiliary winding provided in the transformer;
a control power supply circuit that rectifies AC power produced in the auxiliary winding to output a control voltage for operating the control circuit, wherein
the control power supply circuit includes:
a smoothing capacitor that is connected between output terminals for the control voltage and is to be charged with power obtained by rectifying the AC power; and
a charge thinning circuit that intermittently charges the smoothing capacitor so that a voltage value between both ends of the smoothing capacitor reaches a set value of the control voltage; and
an output setting circuit that switches the set value of the output voltage between a first value and a second value smaller than the first value, wherein
the charge thinning circuit intermittently charges the smoothing capacitor when the set value of the output voltage is the first value.

9. The power supply device according to claim 8, further comprising a current sensor that detects a value of a current flowing from the power supply device to a load, wherein
the charge thinning circuit intermittently charges the smoothing capacitor when the value of the current detected is equal to or greater than a predetermine value.

10. The power supply device according to claim 8, further comprising a DC/DC converter that outputs DC power having a voltage value of a third value smaller than the second value based on power obtained by rectifying output of the transformer, wherein
the set value of the control voltage is equal to or greater than a value of a minimum operational voltage of the DC/DC converter.

11. The power supply device according to claim 8, wherein the output setting circuit switches the set value of the output voltage to the second value when a signal for giving a command to switch to a power-saving mode is inputted.

12. The power supply device according to claim 8, wherein the set value of the control voltage is greater than a minimum operational voltage of the control circuit.

13. The power supply device according to claim 8, further comprising another control circuit that operates by power of the control voltage supplied from the control power supply circuit and operates or stops while the control circuit operates.

* * * * *